(12) United States Patent
Ochi

(10) Patent No.: US 9,015,310 B2
(45) Date of Patent: Apr. 21, 2015

(54) COMMUNICATION SYSTEM USING SERVER AGENTS ACCORDING TO SIMPLE NETWORK MANAGEMENT PROTOCOL

(75) Inventor: Norikazu Ochi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/433,759

(22) Filed: Mar. 29, 2012

(65) Prior Publication Data

US 2012/0254415 A1    Oct. 4, 2012

(30) Foreign Application Priority Data

Mar. 31, 2011    (JP) .................................. 2011-077006

(51) Int. Cl.
*G06F 15/173* (2006.01)
*H04L 12/24* (2006.01)
*H04L 29/08* (2006.01)

(52) U.S. Cl.
CPC .......... *H04L 41/0213* (2013.01); *H04L 41/046* (2013.01); *H04L 41/069* (2013.01); *H04L 67/28* (2013.01)

(58) Field of Classification Search
CPC ..... H04L 43/04; H04L 43/08; H04L 43/0876; H04L 43/00
USPC .......................... 709/220, 224, 226, 203, 225
See application file for complete search history.

(56) References Cited

U.S. PATENT DOCUMENTS

| | | | |
|---|---|---|---|
| 7,546,365 B2 | 6/2009 | Torii | |
| 2003/0149763 A1* | 8/2003 | Heitman et al. | 709/224 |
| 2005/0027851 A1* | 2/2005 | McKeown et al. | 709/224 |
| 2010/0049781 A1* | 2/2010 | Keeni | 709/202 |
| 2010/0199188 A1* | 8/2010 | Abu-Hakima et al. | 715/733 |

FOREIGN PATENT DOCUMENTS

| | | |
|---|---|---|
| CN | 1455550 | 11/2003 |
| CN | 101826993 | 9/2010 |
| JP | 2002140240 | 5/2002 |

(Continued)

OTHER PUBLICATIONS

Chinese Office Action dated Jul. 18, 2014 in corresponding Chinese Patent Application No. 201210082434.1 with English language translation of Chinese Office Action.

(Continued)

*Primary Examiner* — Vivek Srivastava
*Assistant Examiner* — Normin Abedin
(74) *Attorney, Agent, or Firm* — Young & Thompson

(57) ABSTRACT

A plurality of communication devices communicates with each other via a network in accordance with a simple network management protocol (SNMP). The communication devices include agents with specific identifications. At least one communication device includes a proxy manager. The agent updates its status log at each status transition. The proxy manager periodically monitors communication devices, irrespective of their conditions as to whether or not communication devices are each under maintenance, independently of trap messages notifying events that occur on the network. The proxy manager collects statuses of agents included in communication devices so as to store them in connection with agents. Thus, it is possible to periodically monitor agents under maintenance without conducting a status monitoring operation.

12 Claims, 3 Drawing Sheets

(56) References Cited

FOREIGN PATENT DOCUMENTS

| | | |
|---|---|---|
| JP | 2006-023922 | 1/2006 |
| WO | 2007013583 | 2/2007 |

OTHER PUBLICATIONS

Japanese Office Action, dated Oct. 28, 2014, in corresponding Japanese Patent Application No. 2011-077006.

* cited by examiner

FIG. 2

| STATUS | AGENT ID LIST | | | | | | | | |
|---|---|---|---|---|---|---|---|---|---|
| OPERATING (ACTIVE) | ↑ | ↑ | ↑ | | | | | | |
| OPERATING (BACKUP) | | | | | | | | | |
| UNIMPLEMENTED | | | | | | | | | |
| BEFORE OPERATION | | | | | | | | | |
| FAULT | | | | | | | | | |

FIG. 3

| STATUS | AGENT ID |
|---|---|
| OPERATING (ACTIVE) | |
| OPERATING (BACKUP) | |
| UNIMPLEMENTED | |
| BEFORE OPERATION | |
| FAULT | |

COMMUNICATION SYSTEM USING SERVER AGENTS ACCORDING TO SIMPLE NETWORK MANAGEMENT PROTOCOL

BACKGROUND OF THE INVENTION

1. Field of the Invention

The present invention relates to a communication system that uses server agents according to a simple network management protocol (SNMP).

The present application claims priority on Japanese Patent Application No. 2011-77006, the entire content of which is incorporated herein by reference.

2. Description of the Related Art

In a network management system, a management device communicates with a plurality of devices via a network in accordance with a network management protocol such as SNMP (Simple Network Management Protocol).

Patent Literature 1 (PLT 1: Japanese Patent Application Publication No. 2006-23922) discloses a server system in which a manager communicates with a plurality of servers in connection with a controller in accordance with the SNMP. Herein, the manager uses the same object ID (i.e. an ID defining an object per each server) to obtain server management information via the controller and to instruct each server to transmit its management information. Additionally, a proxy server is provided to confirm the status of an agent per each server under maintenance when an operator conducts a status confirmation operation with the manager. When the manager makes status confirmation via the proxy server, it is possible to confirm the status of an agent included in the proxy server as well.

The technology disclosed in PLT 1 is incapable of collecting and managing status information of servers without a special request from the manager. When the proxy server confirms the status of an agent upon a status confirmation operation by an operator, it is difficult to confirm the status of an external agent, subordinate to the proxy server, without a status confirmation operation by an operator. In other words, the foregoing technology requires a status monitoring operation to monitor the status of an agent under maintenance since the proxy manager does not periodically monitor the status per each agent.

SUMMARY OF THE INVENTION

It is an object of the present invention to provide a communication system that is able to periodically monitor an agent under maintenance without a status monitoring operation.

A first aspect of the present invention refers to a communication system including a plurality of communication devices with agents having specific identifications, which communicate with each other via a network in accordance with a simple network management protocol (SNMP). Each of the communication devices has a function of updating a status log due to a shift of status with its agent. At least one of the communication devices includes a proxy manager which periodically monitors the statuses of the communication devices irrespective of their conditions as to whether or not the communication devices are each under maintenance, and which collects status logs from the communication devices so as to reflect an update on status logs by the agents independently of trap messages, notifying events that occur on the network, thus storing status logs in connection with the agents included in the communication devices.

A second aspect of the present invention refers to a communication method adapted to a plurality of communication devices with agents having specific identifications, which communicate with each other via a network in accordance with a simple network management protocol (SNMP). The communication method includes a step of updating a status log per each agent due to a shift of status per each agent; a step of implementing a proxy manager by use of at least one of the plurality of communication devices; a step of periodically monitoring statuses with respect to the communication devices irrespective of their conditions as to whether or not the communication devices are each under maintenance; a step of collecting status logs from the communication devices so as to reflect an update on status logs by the agents independently of trap messages, which notify events that occur on the network; and a step of storing status logs in connection with the agents included in the communication devices.

In the above, each communication device has a function of determining a status per each agent in accordance with a status transition procedure which is determined in advance. Thus, each agent may determine its status based on a grade at fault recovery, a grade at reboot completion, or a grade at implementation, thus updating its status log based on the determined status.

According to the present invention, it is possible to periodically monitor the status of an agent under maintenance without conducting a status monitoring operation.

BRIEF DESCRIPTION OF THE DRAWINGS

These and other objects, aspects, and embodiments of the present invention will be described in more detail with reference to the following drawings.

FIG. 2 diagrammatically shows a data configuration of an agent status log of a proxy server included in the network management system.

FIG. 3 diagrammatically shows a data configuration of a status log of an agent server included in the network management system.

DESCRIPTION OF THE PREFERRED EMBODIMENT

The present invention will be described in further detail by way of examples with reference to the accompanying drawings.

Figure 1:
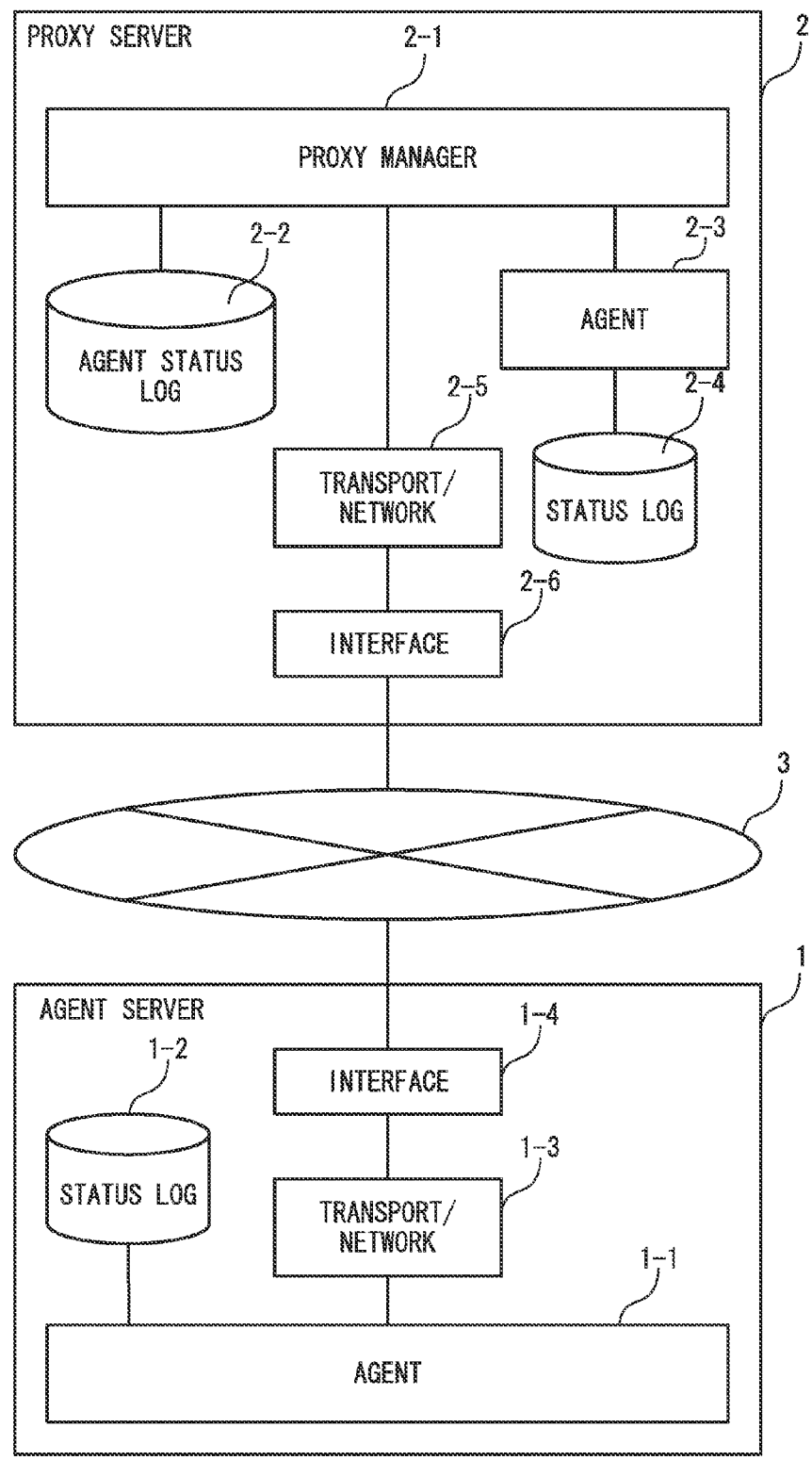
FIG. 1 a block diagram of a network management system according to a preferred embodiment of the present invention.

FIG. 1 is a block diagram of a network management system according to a preferred embodiment of the present invention. The network management system includes an agent server 1 and a proxy server 2 which are connected via a network 3. Herein, the agent server 1, which is a device under management, includes an agent 1-1, a status log 1-2, a transport/network part 1-3, and an interface (I/F) 1-4. The agent 1-1 updates the content of the status log 1-2 upon each status transition. The agent server 1 is connected to the network 3 via the transport/network part 1-3 and the interface 1-4.

The proxy server 2 includes a proxy manager 2-1, an agent status log 2-2, an agent 2-3, a status log 2-4, a transport/network part 2-5, and an interface (I/F) 2-6. According to the SNMP, the proxy manager 2-1 is able to periodically monitor the status of the agent server 1 under maintenance independently of its trap message. The agent 2-3 updates the content of the status log 2-4 upon each status transition.

The proxy manager 2-1 is able to confirm the status of the agent server 1. That is, the proxy manager 2-1 is connected to the network 3 via the transport/network part 2-5 and the interface 2-6 so as to collect status logs, related to the agent server 1 under maintenance and other external agents, including the content of the status log 2-4, thus confirming the status of the agent server 1.

With the aid of the proxy manager 2-1, the agent status log 2-2, the agent 2-3, and its status log 2-4, the proxy manager 2 is able to monitor external agents and to store status logs of external agents.

FIG. 2 diagrammatically shows a data configuration of the agent status log 2-2 in the proxy server 2. As the agent status log 2-2, the proxy server 1 provides a management table that manages agent IDs (i.e. identifications of agents) in connection with status transitions of agents. The proxy server 2 is able to manage which status each agent is connected to with reference to the agent status log 2-2.

With reference to the agent status log 202, the proxy server 2 is able to check the normality of the management table by detecting any inconsistency of status which occurs when an arbitrary agent has zero status, two or more statuses, or an undefined value of status or when the status of an arbitrary agent differs from the status included in a message of an agent ID detected via look-in monitoring.

FIG. 3 diagrammatically shows a data configuration of the status log 1-2 of the agent server 1 and data configuration of status log 2-4 of the proxy server 2. As the status logs 1-2 and 2-4, the agent server 1 and the proxy server 2 provide management tables for managing their agent IDs in connection with status transitions.

The agent server 1 and the proxy server 2 allocate status categories, according to reboot grades, to the agents 1-1 and 2-3 in advance. As shown in FIG. 2, the agent server 1 and the proxy server 2 are able to update the management tables, included in the status logs 1-2 and 2-4, with transitions to status categories upon receipt of a maintenance instruction indicating reboot grades.

The agent server 1 and the proxy server 2 are able to check the normality of their management tables by detecting any inconsistency of status which occurs when an agent ID has zero status, two or more statuses, or an undefined value of status or when the status of an agent ID differs from the status included in an updated message.

Figure 4:
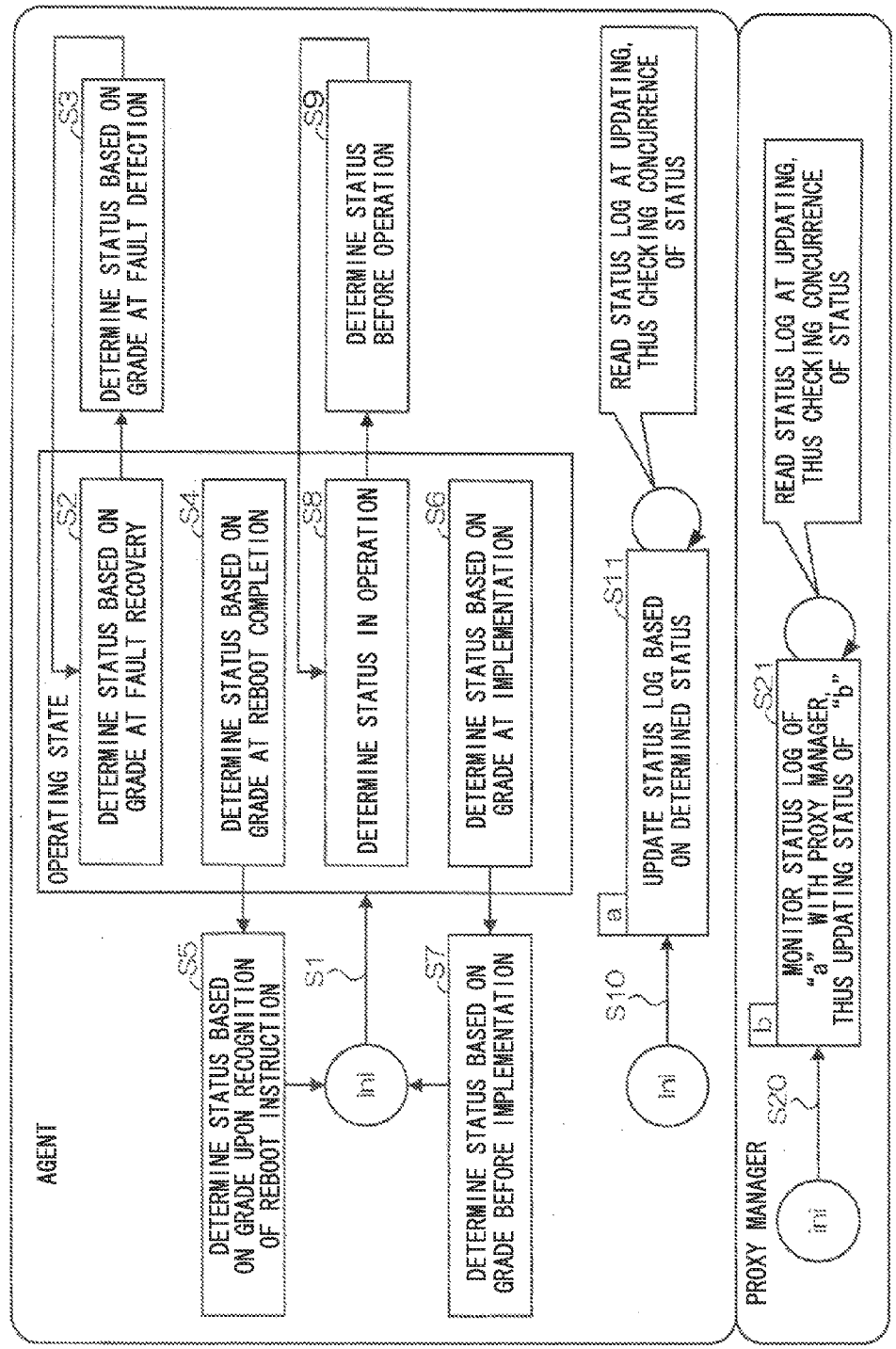
FIG. 4 is a mode transition diagram explaining the operation of an agent included in the proxy server.

Next, detailed operations will be described with respect to the agent 1-1 of the agent server 1 and the agent 2-3 of the proxy server 2. FIG. 4 is a mode transition diagram explaining the operations of the agents 1-1 and 2-3.

In the proxy server 1 and the agent server 2, the agents 1-1 and 2-3 have specific statuses. FIG. 4 shows an agent (representing the agents 1-1 and 2-3) and a proxy manager (representing a proxy manager 2-1), each of which is shifted from one mode to another. Due to a shift from an initial status (ini) to an operating status (step S1), for example, the agent is shifted to a mode to determine a status based on a grade at fault recovery (step S2). In this mode, the agent updates its status log (representing the status logs 1-2 and 2-4) with the determined status (step S11).

Upon detecting a fault at fault recovery, the agent is shifted to a mode to determine a status based on a grade at fault detection (step S3). In this mode, the agent updates its status log with the determined status (step S11).

Upon updating, the agent loads its status log so as to check the concurrence of the same status.

Even at fault recovery, the agent is shifted to a mode to determine a status in operation (step S6). In this mode, the agent updates its status log with the status in operation (step S11). Upon updating, the agent loads its status log so as to check the concurrence of the same status.

Similarly, due to a shift from the initial status (ini) to the operating status (step S1), the agent is shifted to a mode to determine a status based on a grade at reboot completion (step S4). In this mode, the agent updates its status log with the determined status (step S11). The agent loads its status log so as to check the concurrence of the same status. Upon recognizing a reboot instruction at reboot completion, the agent is shifted to a mode to determine a status based on a grade at recognition (step S5).

Due to a shift from the initial status (ini) to the operating status (step S1), the agent is shifted to a mode to determine a status based on a grade at implementation (step S6). In this mode, the agent updates its status log with the determined status (step S11). Upon updating, the agent loads its status log so as to check the concurrence of the same status. At implementation, the agent is shifted to a mode to determine a status based on a grade before implementation (step S7).

In either case, the agent can be shifted to a mode to determine a status in operation (step S8). In this mode, the agent updates its status log with the status in operation (step S11). Upon updating, the agent loads its status log so as to check the concurrence of the same status.

Upon determining the status in operation, the agent is shifted to a mode to determine a status before operation (step S9). In this mode, the agent updates its status log with the determined status (step S11). Upon updating, the agent loads its status log so as to check the concurrence of the same status.

In step S20 in which the proxy manager (i.e. the proxy manager 2-1 of the proxy server 2) starts its operation or in a condition "a" in which the agent (i.e. the agents 1-1 and 2-3) updates its status log(i.e. the status logs 1-2 and 2-4), the proxy manager periodically monitors and loads the status log so as to collect status per each agent. When the proxy manager detects a discrepancy in monitoring the status log, the proxy manager updates its agent status log(i.e. the agent status log 2-2) in a condition "b" (step S21).

Compared with the conventional technology, the present embodiment is characterized by interposing the proxy manager 2-1 between a manager and an agent, so that monitoring flows can be distributed to clusters of agents subordinate to the proxy server 2. This reduces the number of monitoring flows handled by the proxy manager 2-1.

Since the proxy server 2 periodically monitors the status of the agent server 1 independently of its trap message, it is possible to monitor the status of the agent server 1 under maintenance, which is subordinate to the proxy server 2. This allows an operator to visually confirm the status of the agent server 1.

Since the agent 2-3 of the proxy server 2 updates the status under maintenance, it is possible to easily update the status under maintenance.

Since the proxy server 2 is compatible to an http protocol, a maintenance worker is able to easily access the agent server 1 so as to confirm (or display) the status of the agent server 1 under maintenance with a management server installing an http browser.

Without a special request from an external agent, the proxy manager 2-1 is able to collect and manage status information of servers by use of a look-in tool. Additionally, the proxy manager 2-1 implements a tool for allocating management information of agents to messages at once; hence, it is possible to minimize an SNMP flow.

In this connection, the present embodiment is not necessarily limited to the proxy server 2, but is applicable to other types of proxy servers that operate based on Java and VNC (Visual Network Computing).

Lastly, the present invention is not necessarily limited to the present embodiment, which can be further modified in various ways within the scope of the invention as defined by the appended claims.

What is claimed is:

1. A communication system, comprising:
    plural communication devices, each communication device comprising an agent having i) a unique identification and ii) a status log indicating a status of the agent and updated by the agent upon a shift of a state of the agent,
    wherein the communication devices communicate with each other via a network in accordance with a simple network management protocol (SNMP),
    wherein at least one of the communication devices is a proxy server that further includes a proxy manager connected to i) each of the other communication devices such that each agent of the other communication devices is a subordinate agent to the proxy server, ii) an agent status log that represents a monitored state of the subordinate agents of each of the other communication devices, the agent status log being located within the proxy server, and iii) to the agent of the proxy server and the status log of the agent of the proxy server,
    wherein the proxy manager, without performing status monitoring operation responding to a status confirmation operation from an operator, using SNMP periodically monitors the state of the agent of each of the other communication devices, said monitoring including when the other communication devices are under maintenance and being independent of trap messages of the agent of the other communication devices under maintenance, and
    wherein, in periodically monitoring the state of the agent of each of the other communication devices, the proxy manager
    i) loads the status log from the agent of the proxy server and from each of the other communication devices to thereby collect the state of the agent corresponding to each of the other communication devices and the state of the proxy server, and
    ii) based on each of the loaded status logs, the proxy server updates the monitored status of each of the agents in the agent status log and the state of the proxy server, said status logs from the plural communication devices being independent of trap messages received by the proxy server notifying events occurring on the network,
    wherein proxy server is http protocol compatible and allows confirmation of the status of each agent via http access to the agent status log via a look-in tool and without requiring a collection request from an external manager, and
    wherein the status log includes status categories of an active operating mode, a backup operating mode, an unimplemented mode, a fault mode, and a before operation mode.

2. The communication system including a plurality of communication devices according to claim 1, wherein each of the agents included in the communication devices has a function of determining its state in accordance with a status transition procedure which is determined in advance.

3. The communication system including a plurality of communication devices according to claim 2, wherein each of the agents included in the communication devices determines its state based on a fault recovery grade, a reboot completion grade, or an installation grade, thus updating its status log based on the determined state.

4. The communication system including a plurality of communication devices according to claim 2, wherein each of the agents included in the communication devices determines its state based on a fault detection grade upon detecting a fault during fault recovery, thus updating its status log based on the determined state.

5. The communication system including a plurality of communication devices according to claim 2, wherein each of the agents included in the communication devices determines its state based on the reboot completion grade upon recognition of a reboot instruction at reboot completion, thus updating its status log based on the determined state.

6. The communication system including a plurality of communication devices according to claim 2, wherein each of the agents included in the communication devices determines its state based on a preinstallation grade upon detecting a preinstallation condition, thus updating its status log based on the determined state.

7. The communication system including a plurality of communication devices according to claim 2, wherein each of the agents included in the communication devices determines an operating state based on the fault recovery grade, the reboot completion grade, or the installation grade, thus updating its status log based on the determined state.

8. The communication system including a plurality of communication devices according to claim 2, wherein each of the agents included in the communication devices determines an operating state based on a fault detection grade upon detecting a fault, the reboot completion grade upon detecting a reboot instruction, a pre-operation grade upon detecting a pre-operation condition, or a preinstallation grade upon detecting a preinstallation condition, thus updating its status log based on the determined state.

9. The communication system including a plurality of communication devices according to claim 1, wherein, in periodically monitoring the state of the agent corresponding to each of the other communication devices, the proxy server updates the agent status log based on a discrepancy detected from the loaded status log from one of the other communication devices to reflect an update in the state of the agent of the one communication device.

10. A communication method adapted to a plurality of communication devices with agents having unique identifications, which communication devices communicate with each other via a network in accordance with a simple network management protocol (SNMP), said communication method comprising:
    updating a status log within each of the communication devices due to a shift of a state of the agent of each corresponding communication device;
    implementing a proxy server by use of at least one of the plurality of communication devices, the proxy server including a proxy manager connected to i) an agent status log within the proxy server that represents a monitored state of the agents of each of the other communication devices, ii) each of the other communication devices such that each agent of the other communication devices is a subordinate agent to the proxy server, and iii) the agent of the proxy server and the status log of the agent of the proxy server; and
    the proxy manager periodically monitoring the state of the agent of each of the other communication devices, said monitoring including when the other communication devices are under maintenance, wherein, in periodically monitoring the state of the agent of each of the other communication devices, the proxy manager loads the status log of each of the other communication devices to thereby collect the state of the agent corresponding to each of the other communication devices, said status logs from the plural communication devices being independent of trap messages received by the proxy server notifying events occurring on the network; and storing the status logs in connection with the agents of the other communication devices by the proxy manager updating the monitored status of the agent corresponding to each loaded status log in the agent status log located within the proxy server and connected to the proxy manager, the status log including status categories of an active operating mode, a backup operating mode, an unimplemented mode, a fault mode, and a before operation mode.

11. The communication method according to claim 10, further comprising:

determining a state for each agent in accordance with a status transition procedure which is determined in advance.

12. The communication method according to claim 10, wherein, in periodically monitoring the state of the agent corresponding to each of the other communication devices, the proxy server updates the agent status log based on a discrepancy detected from the loaded status log from one of the other communication devices to reflect an update in the state of the agent of the one communication device.

\* \* \* \* \*